United States Patent Office 2,695,858
Patented Nov. 30, 1954

2,695,858

COPPER 3-PHENYLSALICYLATE-AMMONIA ADDITION PRODUCT AND ITS EMPLOYMENT AS A CELLULOSIC PRESERVATIVE

Russell B. Lisle, Jr., Midland, Mich., assignor to The Dow Chemical Company, Midland, Mich., a corporation of Delaware No Drawing. Application May 16, 1952,
Serial No. 288,344

3 Claims. (Cl. 167—38.6)

This invention is concerned with a copper 3-phenylsalicylate-ammonia addition product and with a method and composition for protecting cellulosic materials against microbiological attack.

Several compounds have been suggested for the suppression of the attack of microorganisms on wood, cotton, and other cellulosic materials. Such antimicrobial agents are particularly desirable in applications where the treated materials come in contact with water or moist soil or are exposed to warm moist atmospheric conditions. In particular, wood used for utility poles, railroad ties, fence posts and structural timber exposed to the weather, and textile materials such as canvas used for tarpaulins and tents are subject to attack by various microorganisms which not only impair the appearance of the materials but also cause a marked reduction in their strength. Among the problems in such applications is the provision of an antimicrobial agent which may be applied readily in a liquid formulation but which is not readily removed from the treated material when exposed to weathering factors.

It is an object of the present invention to provide a novel composition of matter having utility in the preservation of cellulosic materials against microbiological attack. A further object is to provide liquid compositions adapted to facilitate the application of the new preservative. Yet another object is to provide a method for the treatment of wood, cotton textiles, and the like for the prevention of deterioration by microorganisms. Other objects will become apparent from the following specification and claims.

The compound of the present invention is a copper 3-phenylsalicylate-ammonia addition product which may be represented by the formula

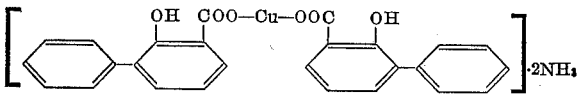

This new compound is a green solid insoluble in water and soluble in aqueous ammonia to give a clear dark blue solution. The copper 3-phenylsalicylate-ammonia addition product may be prepared by reacting one molecular proportion of copper 3-phenylsalicylate with at least two molecular proportions of ammonia in an aqueous medium. The product may be isolated by evaporating to dryness at room temperature.

In practice, it is frequently desirable to prepare the copper 3-phenylsalicylate-ammonia addition product in the presence of an excess of aqua ammonia together with auxiliary solvents, and to use the resulting solution directly to treat cellulosic materials so as to render them resistant to the attack of microorganisms. In the latter operation, the treated materials may be dried at room temperature after the application of the preservative solution so as to deposit the copper 3-phenylsalicylate-ammonia addition product in and on the treated material. It is among the advantages of the present invention that the deposits of copper 3-phenylsalicylate-ammonia addition product, after air-drying at room temperature, are relatively insoluble and display an extended preservative effect under weathering conditions.

In a representative operation, 10 grams of purified copper 3-phenylsalicylate (analyzing 13.29 percent by weight of copper and 86.26 percent by weight of 3-phenylsalicylic acid equivalent) was slurred in 30 grams of isopropyl alcohol and 40 grams of concentrated aqua ammonia (28 percent by weight of NH₃) and 20 grams of water added to the slurry with stirring at room temperature. The resulting clear dark blue solution was evaporated at a temperature of from 20° to 30° C. to crystallization and the resulting product was air-dried for a period of about two weeks at room temperature to obtain the copper 3-phenylsalicylate-ammonia addition product as a green solid. The latter was insoluble in water, gave off ammonia on treatment with concentrated aqueous sodium hydroxide solution and contained 11.9 percent by weight of copper by analysis as compared with a theoretical copper content of 12.1 percent calculated for

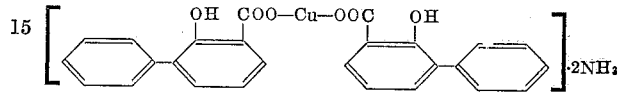

This copper 3-phenylsalicylate-ammonia addition product on heating changes to a black color at 80° C. and fuses partially with decomposition at 119° C.

Conventional methods of application of the compound to cellulosic products generally serve provided that sufficient of the copper 3-phenylsalicylate-ammonia addition product is dispersed on or in the cellulosic material to accomplish the preservation thereof against the attack of microorganisms. The amount of the copper 3-phenylsalicylate-ammonia addition product to be applied varies depending upon the nature of the material treated and the subsequent service conditions to which the treated material may be exposed. Good results have been obtained when using between 0.5 and 3 percent by weight of the copper 3-phenylsalicylate-ammonia addition product based on the dry weight of the treated material although greater amounts may be employed when desired. In such operations, the active compound has been found effective for the preservation of canvas awnings, tarpaulins, shoe liners, conveyor belting, shade cloth, fish nets, cable insulation, pressed cork, wood, paper and the like. In applications to textiles, the active preservative may be applied in conventional vats or baths followed by passage of the treated material through squeeze rolls to adjust the pickup of the preservative. In application to wood, treatment such as vat soaking or vacuum or pressure impregnation may be employed.

When operating in accordance with the present invention, the copper 3-phenylsalicylate-ammonia addition product may be prepared in a treating composition containing water, isopropyl alcohol and an excess of aqua ammonia as previously set forth. Such compositions may be used directly for application to cellulosic materials.

In a further representative operation, a composition was prepared as follows:

| Compound: | Parts by weight |
|---|---|
| Copper 3-phenylsalicylate | 5 |
| Tripropylene glycol methyl ether | 10 |
| Aqueous ammonium hydroxide (28 percent NH₃) | 15 |
| Water | 70 |

The copper 3-phenylsalicylate was made into a paste with the tripropylene glycol methyl ether and the ammonium hydroxide solution added with stirring at room temperature. On completion of the addition of the ammonium hydroxide solution, the water was added to obtain a solution of the copper 3-phenylsalicylate-ammonia addition product as a characteristic deep blue, clear solution. The latter is suitable for direct application to cellulosic materials as previously set forth. If a lower concentration of the active preservative ingredient is desired, the composition as set forth above may be diluted at will by the addition of a mixture of the tripropylene glycol methyl ether, ammonium hydroxide solution and water in the proportions given in the formulation. Small adjustments in concentration may be effected by the addition of water alone but the addition of large amounts of water is to be avoided since 25 parts or more additional water added to the above formulation causes precipitation.

In a field test operation, varying concentrations of the copper 3-phenylsalicylate-ammonia addition product were applied to No. 10 cotton duck so as thoroughly to impregnate the material. Untreated portions of the cotton duck material were maintained as controls. Treated and untreated strips were exposed to weathering in an outdoor exposure test in the warm moist climate of Southwestern Louisiana. The results are set forth in the following table:

| Percent Preservative By Weight of Cotton Duck | Mold Growth After 6 Months' Exposure |
|---|---|
| 1.7 | None. |
| 3.0 | Do. |
| 3.3 | Do. |
| Nil (Untreated) | Heavy. |

I claim:
1. A composition for the preservation of cellulosic materials which comprises an aqueous ammoiacal solution of copper 3-phenylsalicylate-ammonia addition product.
2. A method for the preservation of cellulosic material which comprises the application to said cellulosic material of copper 3-phenylsalicylate-ammonia addition product in a concentration of at least 0.5 percent by weight based on the dry weight of the treated material.
3. A copper 3-phenylsalicylate-ammonia addition product of the formula

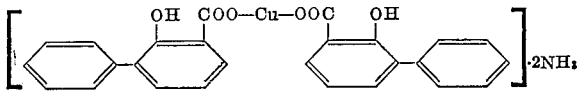

References Cited in the file of this patent

UNITED STATES PATENTS

| Number | Name | Date |
|---|---|---|
| 2,480,084 | Meyer | Aug. 23, 1949 |

OTHER REFERENCES

Foerster, Ber., vol. 28 (1892), page 3416.
Ley et al., Zeitschrift für Anorganische Chemie, vol. 56, pgs. 418 to 421 (1908).